Dec. 30, 1969  R. W. HECKER, JR., ET AL  3,486,181
DOCKBOARD
Filed Jan. 2, 1968  2 Sheets-Sheet 1
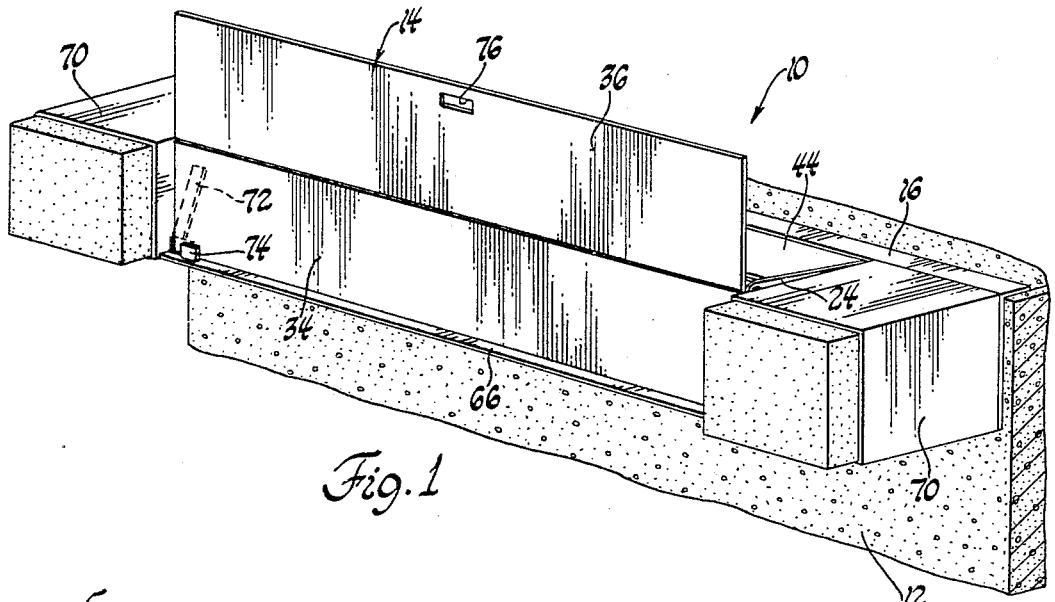
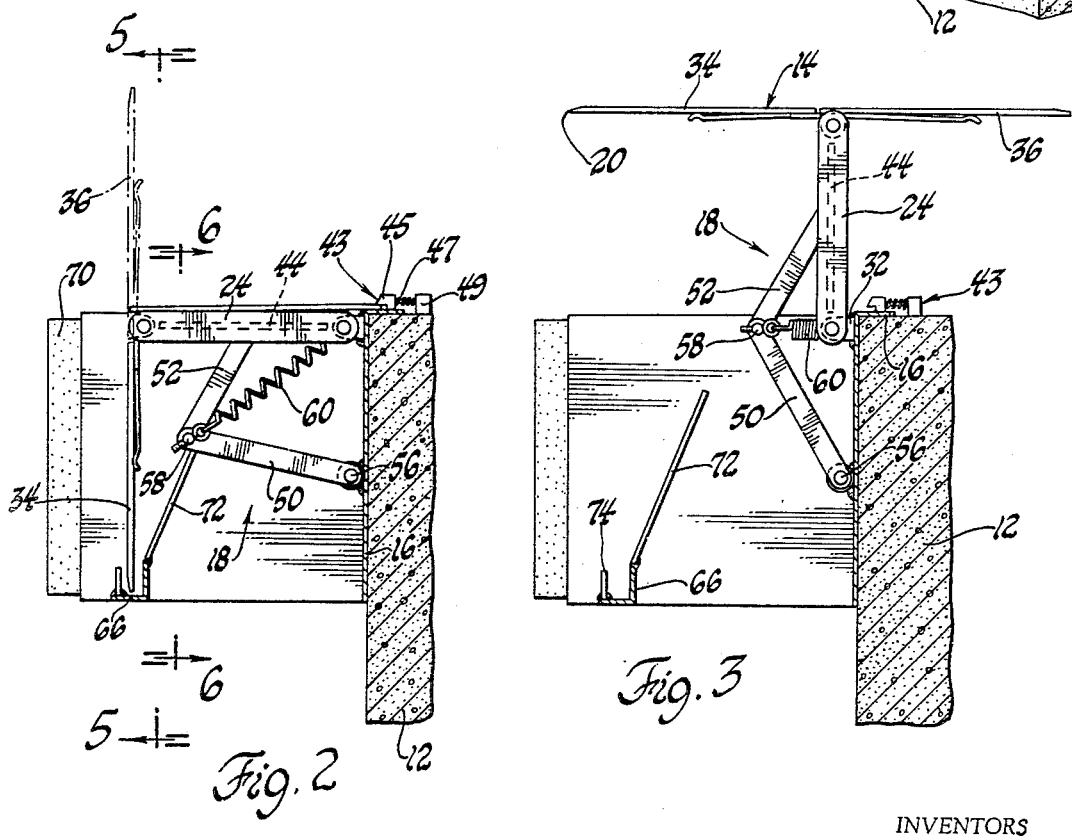
INVENTORS
Robert W. Hecker, Jr.
BY & Robert C. Beckwith
Barnard, McGlynn & Reising
ATTORNEYS

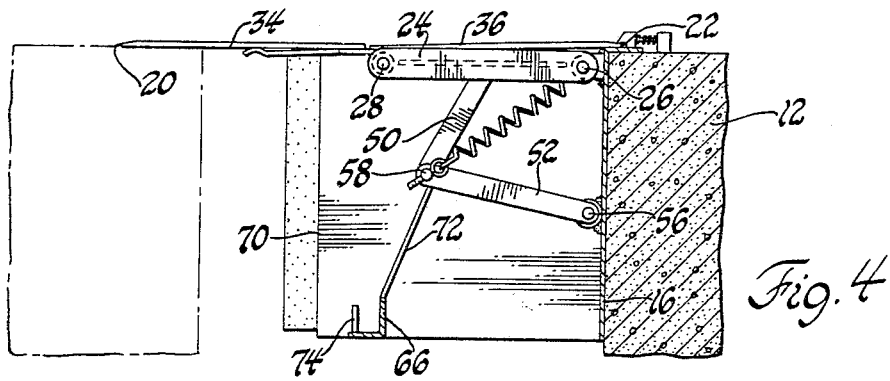
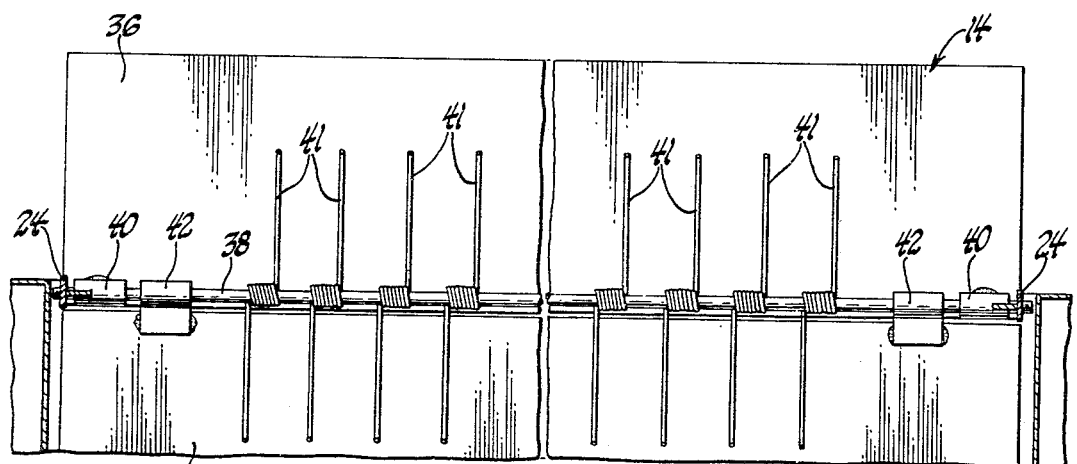
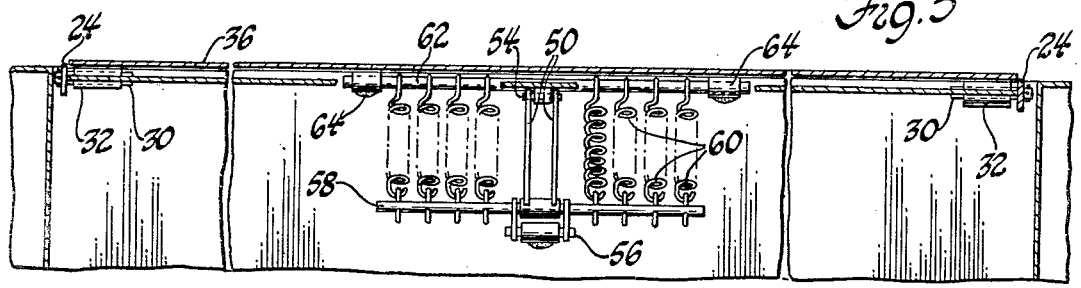
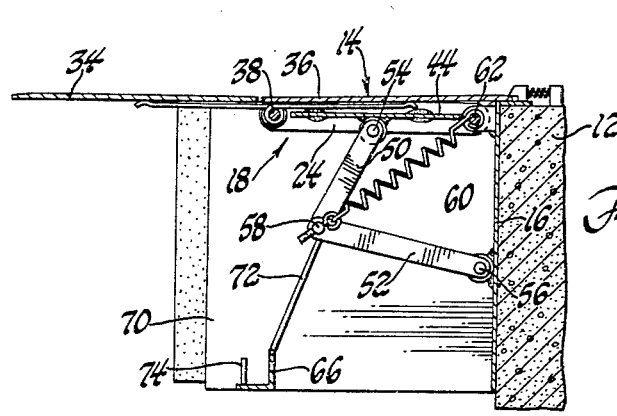

UnitedStatesPatentOffice 3,486,181
Patented Dec. 30, 1969

3,486,181
DOCKBOARD
Robert W. Hecker, Jr., Clare, Mich., and Robert C. Beckwith, Milwaukee, Wis., assignors to Loomis Machine Company, Clare, Mich., a corporation of Michigan
Filed Jan. 2, 1968, Ser. No. 695,106
Int. Cl. E01d 15/12
U.S. Cl. 14—71      16 Claims

ABSTRACT OF THE DISCLOSURE

A dockboard adapted to be attached to a dock and including a support structure, a ramp adatped to extend between the dock and an adjacent vehicle in a generally horizontal cross traffic position and means comprising a pair of spaced links interconnectingt he ramp and the support structure for allowing the ramp to swing in an arcuate path from a generally vertical storage position upwardly to a generally horizontal opsition and then downwardly to the cross traffic position, and including lift means to urge the link to pivot upwardly thus assisting in moving the ramp upwardly in the arcuate path.

---

Many of the prior art dockboards are permanently installed in a large recess in a dock. Docks are normally made of concrete and it is therefore expensive to prepare the dock during construction for receiving and supporting a dockboard. There are also many existing docks which do not have recesses but with which it is desirable to attach a dockboard. However, the space available for a dockboard to occupy in front of such a dock is very limited. There is, therefore, a need for a dockboard which occupies a minimum of space in front of a dock and which may be moved to a cross traffic position to allow traffic to move between the dock and an adjacent vehicle, such as the bed of a truck. There is also a demand for a dockboard which occupies a minimum of space in front of a dock and includes the feature of allowing loading or unloading of the immediate end of the bed of an adjacent vehicle. In other words, a desired feature in such a dockboard is to facilitate end loading or unloading of the bed of a truck.

Accordingly, it is an object and feature of this invention to provide a dockboard which occupies a minimum of space in front of the dock, may be moved to a generally horizontal cross traffic position, and may be moved to an end loading or unloading position.

Another object and feature of this invention is to provide a dockboard having a ramp adapted to extend between a dock and an adjacent vehicle in a generally horizontal cross traffic position with means connecting the ramp to a support structure for allowing the ramp to swing in an arcuate path from a generally vertical storage position upwardly to a generally horizontal position and then downwardly to the cross traffic position.

In correlation withthe foregoing object and feature another object and feature of this invention is to provide such a ramp including a lip section and a platform section with the two sections pivotally connected together so that the platform section may be pivoted to a generally horizontal position when the ramp is in the vertical storage position to allow end loading or unloading of a vehicle adjacent the dock.

In general, these and other objects and features of this invention may be attained in a dockboard including a support structure and a ramp comprising a lip section and a platform section, the platform section being pivotally connected to the lip section. A pair of spaced links are pivotally connected at one end to the ramp and are pivotally connected at the other end to the support structure for allowing the ramp to be pivoted in an arcuate path upwardly from a substantially vertical storage position to a generally horizontal position and then downwardly to a cross traffic position. A lift means is included and comprises springs acting upon a pair of pivotally connected levers for urging the links to pivot upwardly to assist in moving the ramp upwardly in said arcuate path.

Other objects and attendant advantages of the present invention will be readily appreciated as the same becomes better understood by reference to the following detailed description when considered in connection with the accompanying drawings wherein:

FIGURE 1 is a perspective view of a preferred embodiment of the instant invention;

FIGURE 2 is a cross sectional view showing the ramp in an end loading position in full lines and showing the ramp in the substantially vertical storage position in phantom;

FIGURE 3 is a cross sectional view showing the ramp in the raised generally horizontal position and disposed for movement donwwardly to the cross traffic position;

FIGURE 4 is a cross sectional view showing the ramp in the cross traffic position extending between the dock and an adjacent vehicle;

FIGURE 5 is a fragmentary cross sectional view taken substantially along line 5—5 of FIGURE 2 but showing the platform section inthe storage position in solid lines instead of in phantom as in FIGURE 2;

FIGURE 6 is a cross sectional view taken substantially along line 6—6 of FIGURE 2; and FIGURE 7 is a cross sectional view showing the ramp in the cross traffice position.

Referring now to the drawings wherein like numerals indicate like or corresponding parts throughout the several views, a preferred embodiment of the inventive dockboard is generally shown at 10. The dockboard is adapted to be attached to the edge of a dock 12.

The dockboard includes a ramp generally indicated at 14. The ramp 14 is adapted to extend between the dock 12 and an adjacent vehicle in a generally horizontal cross traffic position as shown in FIGURES 4 and 7. A support structure 16 is included and is adapted to be secured to the dock 12 by bolts or the like.

There is also included linkage means generally indicated at 18 interconnecting the ramp 14 and the support structure 16 for controlling movement of the ramp to an arcuate path at it is manually moved from a generally vertical storage position, as illustrated in FIGURE 1, upwardly to a generally horizontal position, as illustrated in FIGURE 3, and then downwardly to the cross traffic position, as illustrated in FIGURES 4 and 7.

As best illustrated in FIGURE 4 the ramp has a front edge 20 for engaging an adjacent vehicle, i.e., the bed of a truck, and a rear edge 22 for engaging the dock.

The linkage means 18 includes a pair of links 24 which are pivotally connected to the ramp 14 intermediate and spaced from the front and rear edges 20 and 22. A plate 44 interconnects the links 24. More specifically, each link 24 is pivotally connected at a first end 26 to the support structure 16 and pivotally supports the ramp 14 at a second end 28 thereof. Each link 24 is rotatably or pivotally connected to the support structure 16 by a stub shaft 30 which in turn is rotatably supported in a bracket 32.

The ramp 14 includes a lip section 34 and a platform section 36. The sections 34 and 36 are pivotally connected together by a shaft 38 and brackets 40 and 42 respectively. Brackets 42 are welded or otherwise secured to the platform section 36 while the brackets 40 are welded or otherwise secured to the lip section 34. The brackets 40 and 42 form a piano hype hinge as the shaft 38 extends through the brackets 40 and 42. Sections 34 and 36 are pivotally connected together about the axis of the shaft 38 and the axis of the shaft 38 is generally along a line aligned with the upper surface of the dock 12 when in the storage position so that the platform section 36 may be pivoted independently of the lip section 34 to a generally horizontal end loading position as illustrated in full lines in FIGURE 2.

There is also included first biasing means comprising the torsion springs 41 for urging the sections 34 and 36 to a coplanar position relative to one another. The torsion springs 41 react between the lip and platform sections, and the lip and platform sections are freely rotatable together about the axis of the shaft 38. A lock means 43 is included for locking the platform section 36 in the end loading position as illustrated in full lines in FIGURE 2. The lock means 43 includes a slidable or rectilinearly movable member 45 with a tapered front surface. A spring 47 in disposed between the member 45 and a rigid member 49 so that when the platform section 36 is pivoted toward the horizontal position it moves the member 45 against the action of the spring 47 so that the rear lip 22 moves into the locked position as illustrated in FIGURE 2. The platform section 36 is held in the horizontal position against the biasing action of the springs 41 by member 45. An operator may move the member 45 against the action of spring 47 and the platform section 36 will pivot to the coplanar position relative to the lip section 34 under the biasing action of springs 41.

There is also included a lift means comprising the first levers 50 and the second levers 52. The first levers 50 are pivotally connected to the plate 44 by a shaft 54. The second levers 52 are pivotally connected to the support structure 16 by the shaft 56. The levers 50 and 52 are pivotally connected together by the shaft 58. There is also included a second biasing means comprising the springs 60 for urging the levers 50 and 52 to pivot relative to one another to pivot the links 24 upwardly to move the ramp in the arcuate path to the position illustrated in FIGURE 3. A second shaft 62 is supported on the support structure 16 by the brackets 64. The springs 60 interconnect the shaft 58 and the shaft 62.

There is also included support means comprising the angle beam 66 for supporting the front edge 20 of the ramp for supporting the ramp in the vertical storage position as illustrated in FIGURES 1 and 2. As alluded to above the beam 66 supports the ramp so that the pivotal connection between the lip section 34 and the platform section 36, i.e. the shaft 38, is generally vertically aligned with the upper surface of the dock 12 so that the platform section 36 may be pivoted from the position shown in phantom in FIGURE 2 to the end loading position illustrated in full lines in FIGURE 2.

A bumper means 70 is disposed at each end of the ramp. Guide means comprising the plates 72 and 74 are disposed on the bumper means 70 for guiding the front edge 20 onto the support beam 66. The members 74 prevent the ramp from pivoting toward the horizontal position, thus preventing a truck or other vehicle from accidently backing thereinto and causing structural damage to the dockboard.

There is also included a hole 76 providing a handle for manually actuating or operating the ramp.

In operating the ramp, it is normally stored in the vertical position illustrated in FIGURE 1. In the event a truck or other vertical disposed adjacent the dock is loaded right to the end of the bed, the platform section 36 may be manually pivoted to the full line position illustrated in FIGURE 2 and locked there with the lock means 43, the lip section 34 being retained in the vertical position by the support means 66. After the end load has been removed the member 45 is moved and the platform section 36 is allowed to move to the vertical storage position illustrated in FIGURE 1. If it is desired to move the ramp to the cross traffic position, the handle or hole 76 is grasped by an operator and the ramp is moved upwardly in an arcuate path under the assistance of the springs 60 of the lift means to the position illustrated in FIGURE 3 where the ramp is disposed generally horizontally. In other words, an operator grasps the hole 76 and pulls the ramp upwardly as the links 24 pivot in an arcuate path relative to the support structure. In so doing the ramp is moved to a more generally horizontal above dock position. In this position the ramp may, in fact, slant downwardly slightly in the forward direction. Once in this position, the operator then moves the ramp in the opposite direction while maintaining the front edge 20 disposed high enough to engage the bed of an adjacent vehicle. During this movement the links 24 pivot in the opposite direction and move from a position as illustrated in FIGURE 3 to the cross traffic position illustrated in FIGURE 7. The lip section 34 is preferably heavier than the platform section 36 so that when a vehicle moves away from the dock the ramp will pivot towards the vertical storage position. The operator will then grasp the handle 76 and move the edge 20 onto the support beams 66 with the guide members 72 and 74 properly positioning the edge 20 on the beam 66.

The embodiments of the invention in which an exclusive property or privilege is claimed are defined as follows:

1. A dockboard adapted to be attached to a dock and comprising: a support structure adapted to be connected to the edge of a dock, a ramp having front and rear edges for extending between a dock and an adpacent vehicle while in a generally horizontal cross traffic position with said front edge engaging the adjacent vehicle and said rear edge engaging the dock, linkage means pivotally connected to said support structure, means pivotally interconnecting said linkage means and said ramp intermediate said front and rear edges for providing pivotal movement of ramp relative to said linkage means about an axis which is fixed relative to said ramp, whereby said ramp may be moved in an arcuate path about the pivotal connection of said linkage means to said support structure to move said ramp from a generally vertical stored position upwardly to a generally horizontal position above the dock.

2. A dockboard as set forth in claim 1 including lift means for urging said linkage means to pivot upwardly about the pivotal connection thereof to said support structure.

3. A dockboard as set forth in claim 2 wherein said linkage means include a pair of spaced links.

4. A dockboard as set forth in claim 3 wherein said ramp includes a lip section and a platform section, said sections being pivotally connected together.

5. A doockboard as set forth in claim 4 including first biasing means for urging said sections to a coplanar position.

6. A dockboard as set forth in claim 5 including lock means for locking said platform section in cross traffic position.

7. A dockboard as set forth in claim 3 including a plate interconnecting said links.

8. A dockboard as set forth in claim 7 wherein said lift means comprise first lever means pivotally connected to said plate, second lever means pivotally connected to said support structure, said lever means being pivotally connected together, and second biasing means urging said lever means to pivot relative to one another to pivot said links upwardly to move said ramp in said arcuate path.

9. A dockboard as set forth in claim 8 wherein said second biasing means comprising a spring interconnecting the pivotal connection between said lever means and said support structure.

10. A dockboard as set forth in claim 9 wherein said ramp includes a lip section and a platform section, said sections being pivotally connected together.

11. A dockboard as set forth in claim 10 including first biasing means for urging said sections to a coplanar position.

12. A dockboard as set forth in claim 11 including lock means for locking said platform section in cross traffic position.

13. A dockboard as set forth in claim 10 including support means for supporting said front edge to support said ramp in said storage position with the pivotal connection between said sections being generally vertically aligned with the upper surface of the adjacent dock.

14. A dockboard as set forth in claim 13 including bumper means attached to said support structure at each end of said ramp.

15. A dockboard as set forth in claim 14 including guide means on at least one bumper means for guiding said front edge onto said support means.

16. A dockboard as set forth in claim 15 including a first shaft pivotally interconnecting said lever means, a second shaft supported on said support structure, said second biasing means comprising a plurality of springs interconnecting said first and second shafts.

References Cited

UNITED STATES PATENTS

| | | | |
|---|---|---|---|
| 1,993,261 | 3/1935 | Colgate | 14—71 |
| 3,122,764 | 3/1964 | Ambli | 14—71 |

JACOB L. NACKENOFF, Primary Examiner